United States Patent
Didszuhn

[15] 3,704,894
[45] Dec. 5, 1972

[54] BELLOWS SLEEVE

[72] Inventor: Wolfgang Didszuhn, Weckenweg 44, 8081 Oberhaunstadt, Germany

[22] Filed: Nov. 1, 1971

[21] Appl. No.: 194,670

[30] Foreign Application Priority Data

Nov. 4, 1970 Germany..................P 20 54 207.8

[52] U.S. Cl.................277/212 FB, 287/85, 277/199
[51] Int. Cl. ...........................................F16j 3/00
[58] Field of Search.277/199, 212, 212 FB; 285/226, 285/228, 235, 236, 237; 287/85

[56] References Cited

UNITED STATES PATENTS

| | | | |
|---|---|---|---|
| 3,231,289 | 1/1966 | Carrell | 277/199 |
| 3,166,333 | 1/1965 | Henley | 277/199 |

FOREIGN PATENTS OR APPLICATIONS 1,209,375  1/1966  Germany.................277/212 FB

*Primary Examiner*—Joseph R. Leclair
*Assistant Examiner*—Robert L. Smith
*Attorney*—W.G. Fasse

[57] ABSTRACT

The bellows sleeve is provided with a slot extending at least partially and longitudinally there through. Adjacent to the slot there are provided flanges which comprise one or more tongues with a wedge shaped cross-section as well as wedge-shaped grooves into which the tongues fit. The flanges are clamped together, for example, by means of screws extending with a press fit through bores in respective material accumulations or lands provided in one of the flanges and respective recesses into which the lands fit in the other flange. Preferably, the lands fit into the recesses also with a press fit.

12 Claims, 4 Drawing Figures

PATENTED DEC 5 1972 3,704,894

BELLOWS SLEEVE

BACKGROUND OF THE INVENTION

The present invention relates to so called bellows sleeves employed for sealing purposes between moving parts. More specifically, the invention relates to such bellows sleeves as are employed for sealing jointed cross shaft axles especially such semi-axles relative to the respective axle gear. These sleeves are made of elastic material such as rubber and are divided longitudinally at least along a portion of the sleeve body. Along the dividing slot there extend flanges radially outwardly which are provided with surfaces facing each other and including sealing tongues and grooves which are pressed against each other by means of screws.

Many suggestions have been made heretofore for the improvement of such bellows sleeves. Mainly these suggestions have been concerned with the improvement of the materials of which the bellows sleeves are made because the requirements with regard to the oil resistance, a sufficient elasticity, and a long life have called for special attention. However, the closure of the divided sleeve also requires substantial attention because the closure as such constitutes a weak spot. This is so because the flanges which are clamped to each other by means of screws are subject to a certain mechanical working or squeezing, although the sleeves are positioned in such a manner that the flanges are located in a neutral motion zone. Accordingly, inspite of said tongues and grooves, the sealing has not always been completely satisfactory.

Sealing failures also occurred as a result of the natural aging of the respective material. A reduced elasticity in turn results in a reduction of the effectiveness or intensity with which the clamping screws hold the flanges together whereby the sealing effect is also reduced.

In order to overcome these difficulties, it has been suggested heretofore to provide the flanges with wide grooves and respect-ively wide or broad bulges. However, it has been found that by these means it was not possible to achieve substantial improvements because the cooperating areas are relatively large and the specific pressure which is rather significant for achieving a good sealing effect is accordingly reduced.

OBJECTS OF THE INVENTION

In view of the foregoing, it is the aim of the invention to achieve the following objects singly or in combination:

to overcome the outlined drawbacks of the prior art, more specifically, to achieve a good sealing of bellows sleeves even over prolonged periods of use;

to provide a special sealing effect in the area of the flanges, especially along the dividing line and this even after prolonged use;

the improved sealing is to be achieved while simultaneously avoiding increasing the wall thickness of the flanges along the dividing line;

to provide improved sealing characteristics while, at the same time, requiring less material than heretofore for making the sleeves; and to construct and shape the entire bellows sleeve in such a manner that it may be easily manufactured so that the final product will be relatively inexpensive.

SUMMARY OF THE INVENTION

The above objects have been achieved according to the invention by providing the tongue as well as the groove with a cross-sectional shape having a wedge configuration, preferably a rather pointed wedge configuration and by further providing material accumulations in the range of the clamping screws which accumulations fit into respective recesses arranged opposite of said accumulations.

The pointed wedge configuration of the tongue and groove has the advantage that they take up very little space so that the size of the flanges does not need to be increased. To the contrary, the rather narrow tongues and grooves permit the use of shorter flanges, that is the flange dimension in the radial direction may be reduced so that less material is required for making the present sleeves.

Another, even more important advantage of the tongue and groove configuration as taught by the invention is seen in that, the pointed shape results in high specific sealing pressure which assures a safe sealing. The weak spots which were present heretofore especially around the clamping screws have been removed according to the invention by said material accumulations and respective recesses arranged around said clamping screw. Thus, the invention is seen in the combination of the pointed wegde shaped tongues and grooves with the material accumulations and recesses.

It has been found that the present bellows sleeves may be easily produced inspite of the improved sealing efficiency because the cooperating sealing means have a relatively simple shape.

BRIEF FIGURE DESCRIPTION

In order that the invention may be clearly understood, it will now be described, by way of example, with reference to the accompanying drawings, wherein.

DETAILED DESCRIPTION OF EXAMPLE EMBODIMENTS

Figure 1:
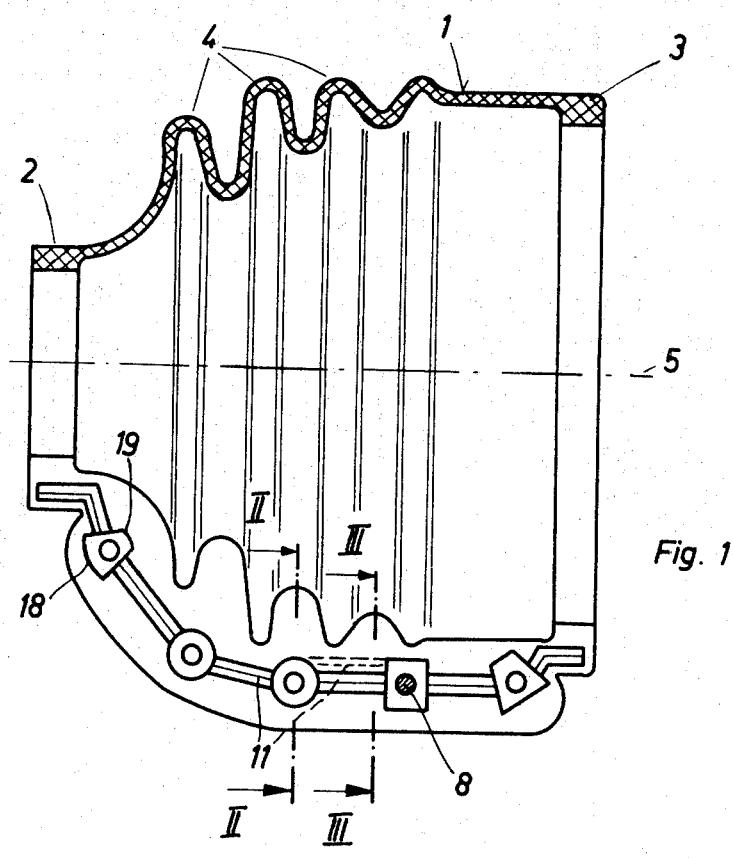
FIG. 1 illustrates a longitudinal sectional view through a bellows sleeve according to the invention.
Figure 2:
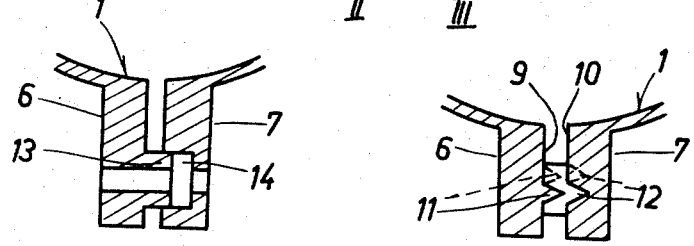
FIG. 2 is a sectional view along the line II—II in FIG. 1.
Figure 3:
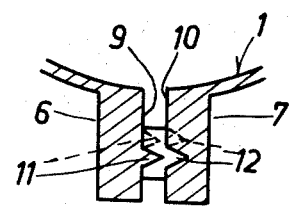
FIG. 3 is a view along line III—III in FIG. 2 and showing the section through the wedge shaped tongue and groove.
Figure 4:
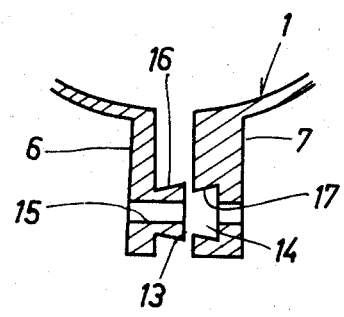
FIG. 4 is a view similar to that of FIG. 2 but illustrating a differently shaped material accumulation and respective recess in the area of a clamping screw.

Referring to FIG. 1, the bellows sleeve 1 is provided with two connection cuffs 2 and 3 which may be connected to housing members or the like(not shown) by means of clamping straps. The sleeve 1 forms several folds 4. The sleeve is slotted longitudinally along a plane extending through the axis 5 of the sleeve and through the plane defined by the drawing sheet. As is best seen in FIGS. 2, 3, and 4, adjacent to the slot the sleeve is provided with flanges 6 and 7 extending radially away from the sleeve proper. The flanges 6 and 7 are clamped to each other by a plurality of clamping screws 8, one of which is shown in FIG. 1.

The flanges 6 and 7 have inner surfaces 9 and 10 facing each other. In order to provide a sufficient sealing between these surfaces 9 and 10, the surface 9 is provided with a tongue 11 having a wedge shaped cross-sectional configuration, especially a pointed wedge shaped configuration whereas the opposite surface 10 is provided with a wedge shaped groove 12 in register with the tongue 11 so that the latter snuggly fits into the groove. The size of the tongue 11 and of the respective groove 12 is such that a high specific area pressure is accomplished along the flanges between the tongue and groove.

If desired, several tongues 11 and several grooves 12 may be arranged in parallel to each other as is indicated by phantom lines in FIG. 3. Such a double or even triple tongue and groove arrangement substantially increases the sealing characteristics of the sleeve because the plurality of tongues gripping into a like plurality of grooves forms a kind of labyrinth packing or seal. It has been found that the proper sealing characteristics are maintained even if the sleeve is subjected to torsional forces.

Each of the clamping screws 8 extends through a respective material accumulation 13 and a respective recess 14 arranged in the surfaces 9 and 10 at those points where the clamping screws extend through the two flanges. The recesses and respective material accumulations are arranged in such positions that the tongues and grooves and the material accumulations as well as the respective recesses form a continuous sealing line. This feature enhances the sealing characteristics substantially in combination with the above mentioned labyrinth seal.

The material accumulations 13 and the recesses 14 are dimensioned in such a manner that a light press fit is provided between the material accumulation and recess. The clamping screws 8 extend through bores 15 in the material accumulation and the portion of the flange wall in register with the recess whereby the diameter of the bore is slightly smaller than the outer diameter of the screw to provide a further press fit between the flange material around the material accumulation and the respective screw. Furthermore, it has been found that the material accumulations should have a height above the flange surface proper which is higher than the height of the tongue 11.

It is preferable that the tongues 11 and material accumulations 13 are arranged on one surface, for example, surface 9 and that the grooves 12 and recesses 14 are arranged on the opposite surface 10. This facilitates the production of the sleeve and flanges in a integral one piece fashion. The material accumulation 13 may have, for example, a cylindrical shape as seen in FIGS. 1 and 2. As a modification, the material accumulations may have a rectangular shape or a trapezoidal shape as also shown in FIG. 1. The improved sealing characteristics are achieved by the above mentioned combination of the lip seal between the tongue and groove which results in an increased specific or area pressure, with the improved sealing in the area of the claming screws due to the light press fit between the material accumulation and the respective recess and the press fit between the screw and its respective bore.

In addition of the above mentioned cylindrical, rectangular, and trapezoidal shape for the material accumulations and respective recesses, FIG. 1 also shows that a trapezoidal shape may be modified by curved bounding surfaces 18 and 19 whereby the material accumulation as well as the respective recess will have such curved bounding surfaces.

The selection of the shape of the material accumulations 13 and the respective recess 14 will mainly depend on the size of the sleeve and also on the flexibility required in any event in the area of the flanges 6 and 7. Thus, a cylindrical shape will be preferable where a compact flange configuration and a good elasticity are required. For large size, heavy sleeves as, for example, may be used in connection with trucks where a lower elasticity is feasable the rectangular or trapezoidal shapes and especially the trapezoidal shape with curved surfaces 18 and 19 may be employed. In the latter instance, the curved surfaces may form portions of cylinder surfaces whereby for example the cylinder surface 19 faces inwardly relative to the sleeve, whereas the cylinder surface 18 faces outwardly. It has been found, that this configuration assures a good fit and permits an easy as well as harmless possibility for rotation or twisting even where the sleeve is subjected to a sharp buckling action.

Preferably, the bounding walls of the accumulations 13 and the respective recesses 14 should extend perpendicularly relative to the surfaces 9 and 10 of the flanges 6 and 7. However, it is also possible to provide a press or snap fastener action by providing the accumulation 13 as well as the recess 14 as shown in FIG. 4 with back-tapers 16 and 17. This feature provides an especially good anchoring whereby, at least for short time periods, the seal may be maintained even without a clamping screw.

Referring further to FIG. 4, it will be noted that the flange 6 may have a wall thickness smaller than the flange 7. This is possible because the tongue 11 and the accumulation 13 compensate for the thinner wall thickness and the good sealing characteristics are thereby maintained. In this connection it is surprising that the wedge shaped tongue and grooves improve the elasticity of the entire sleeve. Other groove and tongue forms employed heretofore caused a stiffening of the entire flange structure.

The above mentioned feature of making the height of the material accumulations 13 higher than the height of the tongues 11 provides so called creeping paths of increased length which is especially advantageous where the sleeves are employed in connection with jointed cross shaft semi-axles of motor vehicles. Surprisingly, these creeping paths facilitate a continuous pressing and squeezing action.

The arrangement of all the tongues 11 and all the material accumulations 13 on one and the same surface and the arrangement of all the grooves 12 and recesses 14 in the other flange surface has the advantage that the tools for producing the present sleeve are simplified.

A further advantage is seen in that the tongue and groove arrangement results in substantial savings of material especially if taken in combination with the thinner flange walls now made possible by the invention and as shown in FIG. 4.

The above mentioned back-taper 16 and 17 also shown in FIG. 4 has the advantage of providing a snap fastener action, so that even where a clamping screw should break, the sudden and dangerous loss of lubricant is avoided because this snap fastener action will maintain the seal at least until repair is possible.

Although the invention has been described with reference to specific embodiments, it is to be understood, that it is intended to cover all modifications and equivalents within the scope of the appended claims.

What is claim is:

1. In a bellows sleeve having a body made of elastic material, a longitudinal slot in said body extending at least partially along said sleeve, first and second flange means extending longitudinally along said slot and radially away from said sleeve body, said flange means having surfaces facing each other, sealing tongue and groove means forming part of said surfaces and arranged for cooperation with each other, as well as means for clamping said flanges together at spaced points along the flanges, the improvement comprising a wedge cross-sectional shape for said sealing tongue means intermediate said clamping means, a corresponding wedge shape for said sealing groove means also intermediate said clamping means, material accumulations at said spaced points forming part of one of said flange surface, and corresponding recesses forming part of the other of said flange surfaces at said points for receiving said accumulations.

2. The bellows sleeve according to claim 1, comprising two wedge shaped tongues and two respective wedge shaped grooves in said flange surfaces for cooperation with each other.

3. The bellows sleeve according to claim 1, wherein said clamping means comprise screw means, a bore through each of said material accumulations and through the flange in register with the respective recesses, said bore receiving a respective one of said screw means with a press fit, said material accumulations and respective recess having a sealing improving shape such that each accumulation fits with a light press fit into the respective recess.

4. The bellows sleeve according to claim 3, wherein said material accumulation and the respective recess have a cylindrical sealing improving shape.

5. The bellows sleeve according the claim 3, wherein said material accumulation and the respective recess have a rectangular sealing improving shape.

6. The bellows sleeve according the claim 3, wherein said material accumulation and the respective recess has a trapezoidal sealing improving shape.

7. The bellows sleeve according to claim 6, wherein at least two opposite surfaces of said trapezoidal shape are curved.

8. The bellows sleeve according to claim 3, where said material accumulation has a height above the respective flange surface which is higher than the tongue.

9. The bellows sleeve according to claim 1, wherein said tongue and material accumulations form part of the surface of one of the flanges, and wherein the groove and the recesses are formed in the surface of the other of said flanges.

10. The bellows sleeve according to claim 9, wherein said flange which comprises said tongue and material accumulations has a wall thickness thinner than that of the flange which comprises said groove and recesses.

11. The bellows sleeve according to claim 1, wherein said material accumulations and said recesses comprise back-tapers whereby a snap-in action between the material accumulation and the respective recess is accomplished.

12. The bellows sleeve according to claim 1, wherein said tongue and groove as well as said material accumulations and recesses are arranged along a continuous line.

* * * * *